United States Patent [19]

Coult et al.

[11] Patent Number: 5,082,343
[45] Date of Patent: Jan. 21, 1992

[54] ISOLATED OPTICAL COUPLER

[75] Inventors: David G. Coult, Bechtelsville, Pa.;
Joel C. Masland, Flemington, N.J.;
Michele A. Milbrodt, Macungie, Pa.

[73] Assignee: AT&T Bell Laboratories, Murray Hill, N.J.

[21] Appl. No.: 630,925

[22] Filed: Dec. 20, 1990

[51] Int. Cl.$^5$ .......................... G02B 6/32; H01S 3/30; G02F 1/00
[52] U.S. Cl. .......................... 385/34; 372/6; 385/47; 359/131
[58] Field of Search ............... 350/96.10, 96.15, 96.16, 350/96.17, 96.18, 96.19, 96.20, 311; 372/6; 250/227.11; 455/601, 602; 370/1, 3

[56] References Cited

U.S. PATENT DOCUMENTS

| | | | |
|---|---|---|---|
| 4,213,677 | 7/1980 | Sugimoto et al. | 350/96.18 |
| 4,358,851 | 11/1982 | Scifres et al. | 372/6 |
| 4,405,199 | 9/1983 | Ogle et al. | 350/96.19 |
| 4,515,431 | 5/1985 | Shaw et al. | 350/96.15 |
| 4,718,055 | 1/1988 | Winzer | 370/3 |
| 4,767,171 | 8/1988 | Keil et al. | 350/96.18 |
| 4,880,289 | 11/1989 | Imoto et al. | 350/96.18 |
| 4,893,890 | 1/1990 | Lutes | 350/96.18 |
| 4,904,043 | 2/1990 | Schweizer | 350/96.18 |
| 4,947,134 | 8/1990 | Olsson | 455/602 |
| 4,995,696 | 2/1991 | Nishimura et al. | 350/96.20 |
| 4,997,252 | 3/1991 | Sugawara et al. | 350/96.20 |
| 5,003,623 | 3/1991 | Asawa | 350/96.18 |
| 5,007,698 | 4/1991 | Sasaki et al. | 350/96.15 |

FOREIGN PATENT DOCUMENTS

| | | | |
|---|---|---|---|
| 0343489 | 11/1989 | European Pat. Off. | 372/6 X |
| 0352974 | 1/1990 | European Pat. Off. | 372/6 X |
| 57-169289 | 10/1982 | Japan | 372/6 X |
| 1-145885 | 6/1989 | Japan | 372/6 X |

OTHER PUBLICATIONS

"Direct Detection Transmission Experiments ... ", *Electronics Letters*, vol. 25, No. 3, Feb. 1989, pp. 236–238, D. J. Malyon et al.

"Impact of Multiple Reflection Noise ... ", *Electronics Letters*, vol. 25, No. 20, Sep. 1989, pp. 1393–1394, J. L. Bimlett et al.

"An 11 Gbit/s, 151 km Transmission Experiment ... ", *IEEE Photonics Technology Letters*, vol. 1, No. 10, Oct. 1989, pp. 334–336, M. Z. Iqbal et al.

"Noise Performance of Erbium-Doped Fiber Amplifier ... ", *IEEE Phot. Tech. Lett.*, vol. 1, No. 11, Nov. 1989, pp. 367–369, C. R. Giles et al.

*Primary Examiner*—Brian Healy
*Attorney, Agent, or Firm*—Wendy W. Koba

[57] ABSTRACT

An isolated optical coupler arrangement is disclosed which is capable of providing a pump signal and a message signal to a fiber amplifier. The coupler comprises a pair of lenses with a wavelength selective device disposed therebetween. The wavelength selective device is chosen to reflect the pump signal applied as an input to the first lens, and transmit the applied message signal. An optical isolator is inserted in optical path between the wavelength selective device and the second lens to further improve the performance of the coupler.

16 Claims, 1 Drawing Sheet

ISOLATED OPTICAL COUPLER

BACKGROUND OF THE INVENTION

1. Field of the Invention

The present invention relates to an optical coupling arrangement and, more particularly, to an optically isolated coupling arrangement.

2. Description of the Prior Art

Optical couplers are perhaps one of the most ubiquitous of all passive optical components and may be found in virtually any optical communication system. One use of optical couplers which is the subject of much current study is in the field of fiber amplifiers, since these amplifiers require that both a communication signal and a pump signal be coupled into the amplifying medium, with the medium itself coupled to the optical signal path. The successful operation of fiber amplifiers may be dependent upon the ability to couple maximum pump power into the amplifying gain medium, as well as the ability to control the multiple reflections present within the system. As reported in an article entitled "An 11 Gbit/s, 151 km Transmission Experiment Employing a 1480 nm Pumped Erbium-Doped In-Line Fiber Amplifier" by M. Z. Iqbal et al. appearing in *IEEE Photonics Technology Letters*, Vol. 1, No. 10, October 1989 at pp. 334-6, the performance of systems utilizing erbium-doped fiber amplifiers is found to be degraded by the presence of signal-spontaneous beat noise and reflection-induced lasing within the amplifying medium. Iqbal et al. propose a system for multi-gigabit applications which utilizes a pair of isolators, with a first isolator located at the transmitter output and a second isolator located at the amplifier input. Although such isolators may improve the system performance, the size and complexity of the resultant system is also increased.

A single isolator approach is discussed in an article entitled "Impact of Multiple Reflection Noise in Gbit/s Lightwave Systems with Optical Fibre Amplifiers" by J. L. Gimlett et a. appearing in *Electronic Letters*, Vol. 25, No. 20, September 1989, at pp. 1394-4. Gimlett et al. propose an arrangement including a counter-propagating pumped fiber amplifier, with an optical isolator located at the amplifier input. A dichroic coupler is utilized to provide the pump signal to the fiber amplifier. As with the Iqbal et al. arrangement described above, the optical isolator and pump coupler of Gimlett et al. are separate, physically displaced devices.

A need, remains in the art, therefore, for providing an isolated coupled arrangement for applications such as fiber amplifiers.

SUMMARY OF THE INVENTION

The need remaining in the prior art is addressed by the present invention which relates to an optical coupling arrangement and, more particularly, to an optically isolated coupling arrangement suitable for fiber amplifier applications.

In accordance with an exemplary embodiment of the present invention, an isolated optical coupler comprises a first collimating lens (for receiving a first optical signal) and a second collimating lens, with a wavelength selective device disposed therebetween. The wavelength selective device is chosen so as to reflect the wavelength of the first optical signal and pass the wavelength of a second optical signal applied as an input to the coupler. An optical isolator is included within the coupler and disposed in the signal path between the wavelength selective device and the second collimating lens. The isolator is utilized to essentially prevent reflected energy of the second signal from re-entering and degrading the performance of an attached transmitting device.

An advantage of the arrangement of the present invention is that the wavelength selective device also functions as a filter for the second signal. Therefore, when the coupler is utilized in fiber amplifier applications, the filter will essentially block any extraneous noise signals from entering the fiber amplifier, substantially reducing the effects of spontaneous emission within the fiber amplifier. Further, the wavelength selective device may comprise a coating which is directly formed on an endface of the first lens, thus further reducing the number of individual components required in the coupler arrangement. Additionally, anti-reflective coatings may be disposed on various surfaces within the coupler to control internal reflections and thus improve return loss.

In one embodiment of the present invention, an isolated coupler may be inserted in a transmission path between a transmitter and a fiber amplifier (i.e., "upstream" of the amplifier). The coupler is utilized to provide the pump signal input to the amplifier, while allowing the message signal from the transmitter to pass through the coupler essentially unimpeded. This particular embodiment is referred to as a "co-propagating" fiber amplifier, since the message signal and the pump signal pass through the amplifier in the same direction.

Alternatively, an isolated coupler of the present invention may be inserted in a transmission path after a fiber amplifier (i.e., "downstream" of the amplifier). In this case, the coupler is formed so as to reflect a pump signal applied as an input thereto back into the fiber amplifier in the direction opposite of the message signal flow. As is well-known in the fiber amplifier technology, the direction of propagation of the pump signal does not affect the performance of the amplifier, since the simultaneous existence of the message and pump signals within the amplifier is the only requirement for providing amplification of the message signal. This particular embodiment is referred to as a "counter-propagating" fiber amplifier as a result of the opposite signal flow directions.

Further, an alternative communication system may utilize a pair of isolated couplers formed in accordance with the present invention, with a fiber amplifier disposed therebetween. This particular embodiment is referred to as a "double-pumped" fiber amplifier, since both co- and counter-propagating pump signals are applied as inputs to the fiber amplifier. Such an arrangement is known to increase the pump power supplied to the fiber amplifier.

In yet another embodiment of the present invention, an isolated optical coupler may be utilized simply to multiplex a pair of separate signals onto a single optical signal path. In this case, the "pump" signal input as defined above is replaced by a second message signal which is desired to be transmitted. A benefit of the present invention is that the inclusion of the isolator within the coupler will essentially prevent reflected signals from re-entering one of the transmitters coupled thereto.

Other and further advantages or embodiments of the present invention will become apparent during the course of the following discussion and by reference to the accompanying drawings.

BRIEF DESCRIPTION OF THE DRAWING

Referring now to the drawings, where like numerals represent like parts in several views.

DETAILED DESCRIPTION

The following discussion of the present invention includes a number of embodiments related to fiber amplifier applications, with various isolated couplers of the invention including input and output fibers to provide the necessary attachments. It is to be understood that the various embodiments are exemplary only, and that the subject matter of the present invention may be provided in a substantially more integrated arrangement, for example, using integrated optical waveguides and optical amplifying gain medium disposed within an optical substrate. Additionally, it should be noted that the isolated coupling arrangement of the present invention is not limited to applications involving fiber amplifiers. There exist many other applications for such couplers, including arrangements where it is desired to multiplex a pair of high bit rate signals onto a common signal path, where an isolated coupler may be utilized to essentially prevent reflected message signals from re-entering the laser transmitter sources. One such exemplary system will be discussed below in association with FIG. 4.

Figure 1:
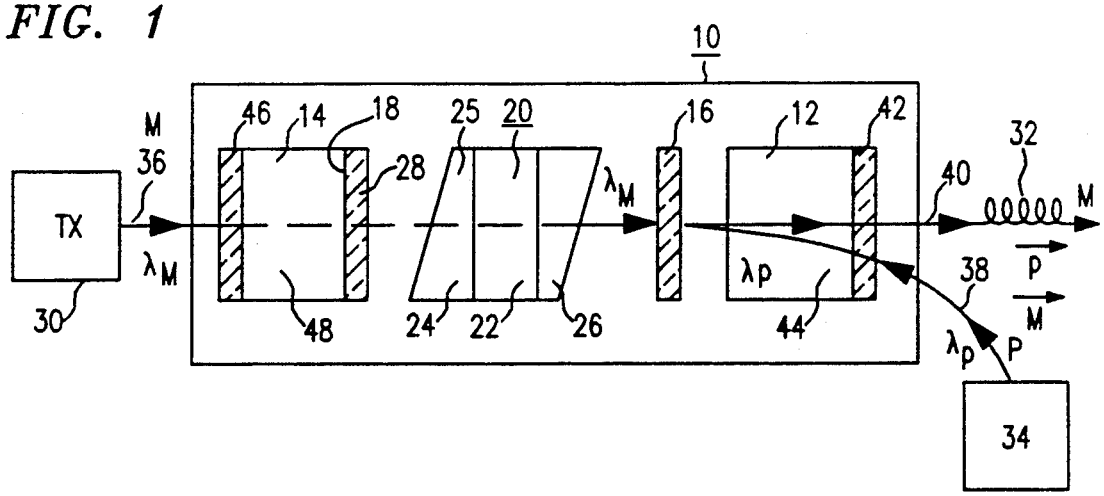
FIG. 1 illustrates a co-propagating pumped fiber amplifier utilizing an exemplary isolated optical coupler formed in accordance with the present invention.

FIG. 1 illustrates a particular fiber amplifier arrangement utilizing an exemplary isolated coupler 10 formed in accordance with the present invention. For the illustrated arrangement, isolated coupler 10 is utilized in association with a co-propagating fiber amplifier, that is, where isolated coupler 10 is inserted "upstream" of the fiber amplifier and the message signal and pump signal propagate in the same direction through the fiber amplifier. As discussed above, the isolated coupler arrangement of the present invention may also be utilized as a "downstream" counter-propagating coupler, as will be discussed in detail below in association with FIG. 2. Returning to FIG. 1, isolated coupler 10 is illustrated as being disposed in the optical signal path between a transmitting device 30 and fiber amplifier 32. Coupler 10 utilizes as inputs a message signal M from transmitter 30 and a pump signal P from a pump source 34. Coupler 10 thus functions to multiplex the message and pump signals and direct both signals, via a single output fiber, into fiber amplifier 32. In this particular co-propagating embodiment, signals M and P will pass through fiber amplifier 32 in the same direction, as indicated by the arrows in FIG. 1.

In accordance with the teachings of the present invention, isolated coupler 10 comprises a first collimating lens 12 and a second collimating lens 14. A wavelength selective device 16 is disposed between first lens 12 and second lens 14. Device 16 is chosen so as to reflect a first predetermined wavelength $\lambda_P$ (i.e., pump wavelength) and transmit a second predetermined wavelength $\lambda_M$ (i.e., message wavelength).

As discussed above, there exist a number of high bit rate communication systems which require the transmitting laser to be isolated from the signal path. Further, these multi-gigabit systems have been found to experience signal degradation when isolators are not utilized in conjunction with fiber amplifiers (e.g., signal-spontaneous beat noise, etc.). Therefore, in accordance with the teachings of the present invention, coupler 10 includes an optical isolator 20 disposed in the message signal path between second lens 14 and wavelength selective device 16. For the particular embodiment of FIG. 1, isolator 20 is illustrated as comprising a Faraday rotator 22 disposed between a pair of birefringent plates 24,26. The operation of such an isolator is well-known in the art, and functions to essentially prevent any signal passing through wavelength selective device 16 in the reverse direction from re-entering lens 14 and being coupled back into transmitting device 30. An additional AR coating 28 may be included on the appropriate endface 18 of second lens 14 to essentially block reflections from surface 25 of plate 24.

As shown in FIG. 1, message signal M propagates along a first input fiber 36 and is coupled into second lens 14 of coupler 10. Message signal M passes through, in sequence, second lens 14, isolator 20, device 16 and first lens 12. Message signal M then exits coupler 10 and is coupled into an output fiber 40. Pump input signal P propagates along a second input fiber 38 and is coupled into first lens 12. Pump signal P, as shown in FIG. 1, is reflected by device 16 and passes again through first lens 12, exits coupler 10 and is also coupled into output fiber 40. Therefore, message signal M and pump signal P will propagate simultaneously, in the same direction, along output fiber 40 and be applied as inputs to fiber amplifier 32. Fiber amplifier 32 is appropriately doped (with erbium, for example) such that the presence of pump signal will stimulate emission and provide amplification of message signal M. An advantage of this particular "upstream" embodiment of the present invention, as mentioned above, is that wavelength selective device 16 may perform as a narrow bandpass filter which thus functions to reduce the propagation of unwanted signals through the coupler and into the amplifier. Therefore, spontaneous emission noise in amplifier 32 may be significantly reduced.

In order to reduce reflections and provide improved index matching between the various individual portions, anti-reflection (AR) means may be included in isolated coupler 10. FIG. 1 illustrates, by way of example, a first AR coating 42 disposed on the appropriate endface 44 of first lens 12. A second AR coating 46 is illustrated in FIG. 1 as being formed on the appropriate endface 48 of second lens 14. An additional coating (not shown) may be formed on lens 12 at endface 47. Alternatively, various discrete anti-reflective components, such as appropriately-coated transparent plates and/or wedges, may be utilized in association with isolated coupler 10 to further reduce internal reflection problems.

As compared to prior art arrangements which utilize separate and discrete isolator and pump coupler components, the arrangement of the present invention as described above provides a degree of compactness and improved coupling efficiency by virtue of combining both functions within a single unit.

Figure 2:
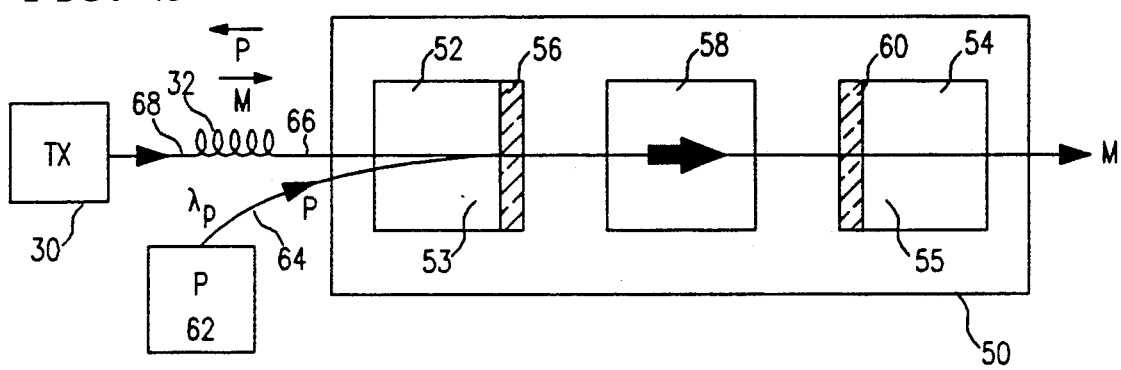
FIG. 2 illustrates a counter-propagating pumped fiber amplifier utilizing an exemplary isolated optical coupler formed in accordance with the present invention.

Since the operation of a fiber amplifier is independent of the direction of travel of the pump signal therethrough, an isolated coupler of the present invention may also be inserted "downstream" of a fiber amplifier, in a so-called counter-propagating position. One such coupler arrangement 50 is illustrated in FIG. 2. In this arrangement, coupler 50 comprises a first collimating lens 52 and a second collimating lens 54, with a wavelength selective device 56 disposed therebetween. As with wavelength selective device 16 of FIG. 1, device 56 is chosen so as to reflect the wavelength $\lambda_P$ of pump signal P and transmit the wavelength $\lambda_M$ of message signal M. In this particular embodiment, wavelength selective device 56 is illustrated as a coating directly formed on the appropriate endface 53 of first lens 52. It is to be understood that various wavelength selective devices, including but not limited to the discrete device as illustrated in FIG. 1 or the coating as illustrated in FIG. 2, may be used to perform this function.

Coupler 50 further comprises an optical isolator 58 which is disposed in the optical signal path between wavelength selective device 56 and second collimating lens 54. As with isolator 20 of coupler 10, isolator 58 of coupler 50 is utilized to minimize reflections of the message signal. Here, isolator 58 is merely represented by a single block, with a heavy arrow indicating the allowed direction of propagation. It is to be understood that isolator 58 may comprise components similar to isolator 20 of FIG. 1, or any other arrangement suitable of providing optical isolation at the desired wavelength. An AR coating 60 is illustrated as disposed between isolator 58 and second lens 54 to essentially block reflections from surface 55 of plate 54.

In operation, a pump signal P from a pump source 62 is coupled by a first optical fiber 64 into first lens 52 of coupler 50. The pump signal is subsequently reflected, as illustrated, by coating 56 and passes a second time through first lens 52 where it then exits coupler 50 and is coupled into a second fiber 66. Fiber 66, as shown, is coupled to fiber amplifier 32. Message signal M from a transmitter 30 is coupled by a fiber 68 into fiber amplifier 32 such that both the message and pump signals exist simultaneously within fiber amplifier 32. As evident from the illustration of FIG. 2, coupler 50 is defined as a counter-propagating coupler in that message signal M and pump signal P will propagate fiber amplifier 32 in opposite directions, illustrated by the arrows in FIG. 2. The amplified message signal M exiting fiber amplifier 32 along fiber 66 will subsequently pass through coupler 50 essentially unimpeded, since wavelength selective device 56 is chosen to be transparent to the message wavelength $\lambda_M$. An advantage of the counter-propagating arrangement of FIG. 2 is that the placement of wavelength selective coating 56 will essentially prevent any propagation of the pump signal along the output signal path.

As with the co-propagating embodiment of FIG. 1, counter-propagating coupler 50 of FIG. 2 may include additional AR devices to minimize internal reflections within coupler 50. Additional alignment considerations must also be addressed so as to maximize the coupling efficiency of the arrangement of the present invention, in particular, the alignment of the output fiber to the coupler. Such alignment techniques are considered to be well-known to those skilled in the art and need not be considered here.

Figure 3:
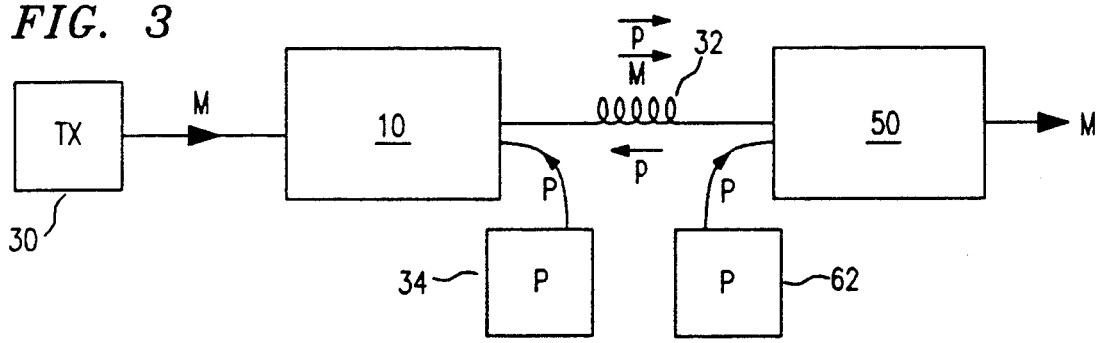
FIG. 3 illustrates a double-pumped fiber amplifier utilizing a pair of exemplary isolated optical couplers formed in accordance with the present invention.

There may exist applications, as mentioned above, where it is desirous to apply more pump power to the amplifier than is available from a single pump source. In this case, a double-pumped arrangement may be utilized, which includes both a co- and a counter-propagating pump source. FIG. 3 illustrates one such exemplary system utilizing a pair of isolated optical couplers formed in accordance with the present invention. Specifically, the arrangement combines the systems of FIGS. 1 and 2, with co-propagating first isolated coupler 10 disposed in the signal path between transmitter 30 and fiber amplifier 32. As discussed above in association with FIG. 1, a pump signal P from source 34 is applied as an input to coupler 10 such that message signal M and pump signal P may be applied as simultaneous inputs to fiber amplifier 32. Counter-propagating second isolated coupler 50 is disposed in the signal path at the output of fiber amplifier 32 wherein a pump signal P from source 62 is applied as an input to coupler 50 and is subsequently reflected back into fiber amplifier 32. The co-existence of both pump sources with the message signal results in increased amplification. Alternatively, the embodiment of FIG. 3 may be thought of as a pump sparing arrangement, providing a back-up pump upon failure of either source 34 or 62.

Figure 4:
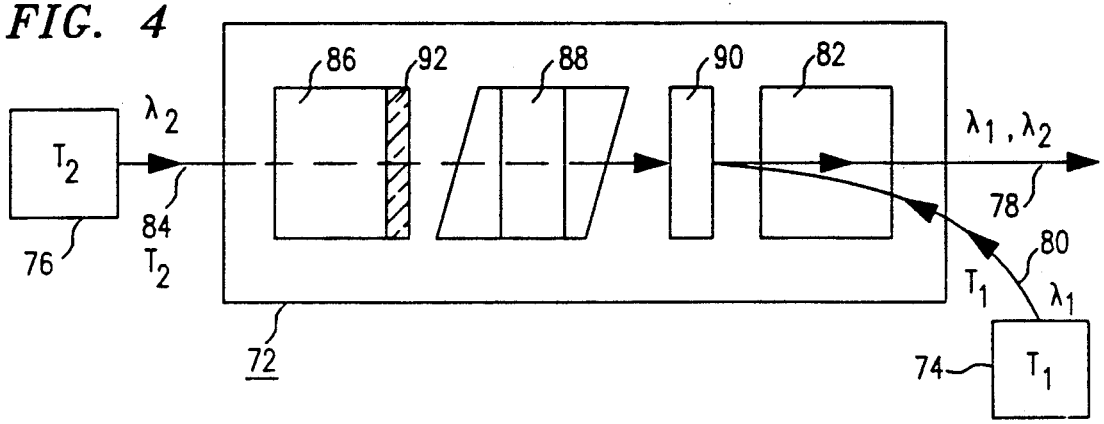
FIG. 4 illustrates an optical transmission utilizing an isolated coupler of the present invention as a multiplexer for coupling a pair of optical inputs onto a single output transmission path.

The isolated coupler arrangement of the present invention, as mentioned above, may be used in applications other than as a fiber amplifier pump coupler. FIG. 4 illustrates a communication arrangement 70 for multiplexing a pair of separate signal sources onto one output signal path. In particular, an isolated coupler 72 as formed in accordance with the present invention is utilized with a pair of separate signal source 74 and 76. A first input signal $T_1$ at a wavelength $\lambda_1$ from a first transmitter 74 and a second input signal $T_2$ at a different wavelength $\lambda_2$ from a second transmitter 76 are applied as separate inputs to coupler 72 and combined to propagate simultaneously along an output signal path 78. As shown, first signal $T_1$ propagates along an optical fiber 80 and is applied as an input to a first collimating lens 82. Second signal $T_2$ propagates along an optical fiber 84 and is coupled to second collimating lens 86 of coupler 72. Disposed between second lens 86 and first lens 82 are, in sequence, an optical isolator 88 and a wavelength selective device 90. Anti-reflective means 92 may be inserted between second lens 86 and isolator 88 to reduce reflections within coupler 72. In accordance with the teachings of the present invention, wavelength selective device 90 is chosen so as to reflect wavelength $\lambda_1$ associated with signal $T_1$ and transmit wavelength $\lambda_2$ associated with signal $T_2$. Therefore, coupler 72 as shown is capable of coupling both input signals into one output signal path 78. Advantageously, the inclusion of isolator 88 in accordance with the present invention protects second transmitter 76 from reflected signals, which may seriously degrade the performance of some transmitters, particularly high speed laser transmitters.

We claim:

1. An optical coupler for coupling a first optical signal at a first predetermined wavelength (e.g., $\lambda_P$) and a second optical optical signal at a second predetermined wavelength (e.g., $\lambda_M$) onto a single optical signal path, the coupler comprising:
   a first collimating lens, including a first port and a second port disposed along the same endface thereof;

a second collimating lens including a single port, said second collimating lens disposed in a coaxial relationship with said first collimating lens;

wavelength selective means disposed between said first collimating lens and said second collimating lens capable of reflecting the first predetermined wavelength and transmitting the second predetermined wavelength; and optical isolating means disposed between said second collimating lens and said wavelength selective means for essentially preventing counter-propagation of the second optical signal through said optical coupler.

2. An optical coupler as defined in claim 1 wherein the coupler further comprises first anti-reflective means disposed between the optical isolating means and the second collimating lens.

3. An optical coupler as defined in claim 2 wherein the first anti-reflective means comprises an anti-reflective coating disposed on the appropriate surface of the second collimating lens.

4. An optical coupler as defined in claim 2 wherein the coupler further comprises second anti-reflective means disposed between the first collimating lens and the associated first and second ports thereof; and third anti-reflective means disposed between the second collimating lens and the associated single port thereof.

5. An optical coupler as defined in claim 4 wherein the second and third anti-reflective means comprise anti-reflective coatings disposed on the appropriate surfaces of the first and second collimating lenses, respectively.

6. An optical coupler as defined in claim 1 wherein the coupler further comprises first anti-reflective means disposed between the first collimating lens and the associated first and second ports thereof; and second anti-reflective means disposed between the second collimating lens and the associated single port thereof.

7. An optical coupler as defined in claim 6 wherein the first and second anti-reflective means comprise anti-reflective coatings disposed on the appropriate surfaces of the first and second collimating lenses, respectively.

8. A fiber amplifier isolated optical coupler for providing as separate inputs to an associated fiber amplifier a pump signal at a first predetermined wavelength (e.g., $\lambda_P$) and a message signal at a second predetermined wavelength (e.g., $\lambda_M$), the fiber amplifier isolated optical coupler comprising:

a first collimating lens including a first port for receiving the pump signal and a second port for being coupled to an associated fiber amplifier;

a second collimating lens, including a single port, disposed in a coaxial relationship with said first collimating lens;

wavelength selective means disposed between said first collimating lens and said second collimating lens capable of reflecting the pump signal and transmitting the pump signal such that said pump signal exits the second port of the first collimating lens and is capable of being applied as an input to an associated fiber amplifier; and optical isolating means disposed between the wavelength selective means and the second collimating lens for essentially preventing reflection of the message signal.

9. A fiber amplifier isolated coupler as defined in claim 8, wherein the isolated coupler is utilized as a co-propagating optical coupler, with the message signal applied as an input to the single port of the second collimating lens, the pump and message signals thereby exiting the second port of the first collimating lens in the same direction as to be applied as co-propagating inputs to an associated fiber amplifier.

10. A fiber amplifier isolated coupler as defined in claim 8, wherein the isolated coupler is utilized as a counter-propagating optical coupler, with the second port of the first collimating lens for being coupled to an associated fiber amplifier whereby the pump signal applied as an input to the first port of said first collimating lens will be reflected from the wavelength selective means and be directed through the second port into said associated fiber amplifier, the pump signal and the applied message signal thus traveling as counter-propagating signals through said fiber amplifier.

11. A fiber amplifier isolated coupler as defined in claim 8 wherein the coupler further comprises first anti-reflective means disposed between the optical isolating means and the second collimating lens.

12. A fiber amplifier isolated coupler as defined in claim 11 wherein the first anti-reflective means comprises an anti-reflective coating disposed on the appropriate surface of the second collimating lens.

13. A fiber amplifier isolated coupler as defined in claim 11 wherein the coupler further comprises second anti-reflective means disposed between the first collimating lens and the associated first and second ports thereof; and third anti-reflective means disposed between the second collimating lens and the single port thereof.

14. A fiber amplifier isolated coupler as defined in claim 13 wherein the second and third anti-reflective means comprise anti-reflective coatings disposed on the appropriate surfaces of the first and second collimating means, respectively.

15. A fiber amplifier isolated coupler as defined in claim 8 wherein the coupler further comprises first anti-reflective means disposed between the first collimating lens and the associated first and second ports thereof; and second anti-reflective means disposed between the second collimating lens and the associated single port thereof.

16. A fiber amplifier isolated coupler as defined in claim 15 wherein the first and second anti-reflective means comprise anti-reflective coatings disposed on the appropriate surfaces of the first and second collimating lenses, respectively.

* * * * *